(12) United States Patent
Laufer

(10) Patent No.: US 8,826,610 B2
(45) Date of Patent: Sep. 9, 2014

(54) DAMAGE PREVENTION HOUSING FOR A ROOF PIPE AND RELATED METHODS

(76) Inventor: Timothy John Laufer, Lake County, FL (US)

( * ) Notice: Subject to any disclaimer, the term of this patent is extended or adjusted under 35 U.S.C. 154(b) by 0 days.

(21) Appl. No.: 12/499,572

(22) Filed: Jul. 8, 2009

(65) Prior Publication Data

US 2011/0005156 A1 Jan. 13, 2011

Related U.S. Application Data

(63) Continuation-in-part of application No. 12/387,640, filed on May 4, 2009, now abandoned.

(60) Provisional application No. 61/126,337, filed on May 2, 2008.

(51) Int. Cl.
*E04B 7/00* (2006.01)
*E04H 12/28* (2006.01)
*E04D 13/00* (2006.01)
*F16L 57/00* (2006.01)

(52) U.S. Cl.
CPC .............. *F16L 57/005* (2013.01); *E04D 13/004* (2013.01)
USPC .................. 52/198; 52/58; 52/219; 52/302.7; 285/43; 454/4; 454/359; 454/368

(58) Field of Classification Search
USPC .................. 52/198, 199, 58, 219, 244, 302.1, 52/302.6, 302.7; 285/43; 454/3, 4, 359, 454/24, 25, 368
See application file for complete search history.

(56) References Cited

U.S. PATENT DOCUMENTS

| | | | | |
|---|---|---|---|---|
| 1,540,192 | A * | 6/1925 | Smith | 285/13 |
| 1,710,304 | A * | 4/1929 | Flynn et al. | 285/42 |
| 3,031,783 | A * | 5/1962 | Burke | 40/660 |
| 3,436,880 | A * | 4/1969 | Kifer | 52/58 |
| 3,650,198 | A * | 3/1972 | Stone | 454/37 |
| 3,797,181 | A * | 3/1974 | Nievelt | 52/105 |
| 4,115,961 | A * | 9/1978 | Bishop | 52/58 |
| 4,206,692 | A * | 6/1980 | Johnston | 454/367 |
| 4,372,585 | A * | 2/1983 | Evora | 285/43 |
| 4,897,974 | A * | 2/1990 | Lane | 52/199 |
| 5,245,804 | A * | 9/1993 | Schiedegger et al. | 52/199 |
| 5,618,416 | A * | 4/1997 | Haefner | 210/163 |
| 5,778,611 | A * | 7/1998 | Michel | 52/198 |
| 5,979,505 | A * | 11/1999 | Drechsel | 138/32 |
| 6,244,006 | B1 * | 6/2001 | Shue et al. | 52/302.1 |
| 6,520,212 | B1 * | 2/2003 | Blivet | 138/96 R |
| 6,959,457 | B2 * | 11/2005 | Hernandez | 4/218 |
| 7,458,888 | B2 * | 12/2008 | Huta | 454/37 |
| 7,900,654 | B2 * | 3/2011 | Moreau et al. | 138/96 R |
| 2006/0211356 | A1 * | 9/2006 | Grassman | 454/4 |

* cited by examiner

*Primary Examiner* — Chi Q Nguyen
(74) *Attorney, Agent, or Firm* — Allen, Dyer, Doppelt, Milbrath & Gilchrist, P.A.

(57) ABSTRACT

A damage prevention housing for a roof pipe may include a hollow body having an interior dimensioned to enclose a roof pipe on a roof, the hollow body having an open proximal end suitable for positioning over the roof pipe and a partially closed distal end dimensioned to preclude access by rodents but allow movement of gases therethrough. The hollow body may further include an aperture positioned adjacent to the proximal end for allowing liquids and gases to move through the aperture and a fastener for securing the hollow body in a fixed position relative to the roof pipe and the roof.

11 Claims, 5 Drawing Sheets

DAMAGE PREVENTION HOUSING FOR A ROOF PIPE AND RELATED METHODS

CROSS-REFERENCE TO RELATED APPLICATION

This application claims the benefit of U.S. Provisional Application No. 61/126,337 filed May 2, 2008, and is a continuation in part of U.S. application Ser. No. 12/387,640 filed on May 4, 2009, the entire disclosures of which are incorporated by reference herein.

FIELD OF THE INVENTION

The present invention relates to the field of protective roofing materials, and, more particularly, to damage prevention housings for preventing damage to roofing pipes and related methods.

BACKGROUND OF THE INVENTION

The vast majority of roofs have one or more pipes extending through the roof to allow gas that has accumulated inside the building to exit the building.

A common type of roof pipe is the roof vent stack. Roof vent stacks and other roof pipes are vulnerable to attack from a wide range of animals, including squirrels, mice and rats. These animals have frequently been known to attack roof pipes, particularly those such as the roof vent stack that are encased in lead.

There have been a number of approaches to solving this problem. One known approach to solving this problem involves encasing the roof pipe in poultry netting, commonly known as chicken wire, or some similar type of wire enclosure. Chicken wire provides relatively poor protection for roof pipes because it is difficult to secure the wire in place on the roof pipe without damaging the roof. The chicken wire is also flexible and may be bent in toward the pipe surface by rodents, thus leaving the roof pipe vulnerable to attack through the chicken wire. The chicken wire approach also results in a very unattractive and unprofessional looking wire enclosure surrounding the roof pipe.

Another approach involves coating the roof pipe with a sealant in liquid or gel form that hardens into position on the roof pipe to prevent access by rodents. This approach may be difficult to implement because of the difficulty in evenly coating the entire exposed roof pipe area. Certain materials used for this coating may not bond well with the lead boot or other roof pipe material. The materials used for this coating may also deteriorate over a relatively short period of time, leaving the roof pipe again vulnerable to attack by rodents.

Another approach is shown in U.S. Pat. No. 6,244,006 to Shue et al (hereafter "Shue" or the "Shue Patent"). The approach in Shue involves a sleeve made of PVC pipe with a separate end piece attached to the top of the sleeve that is fitted over roof vent stack pipes. The end piece is secured to the sleeve and then both the end piece and sleeve are secured in place over the roof vent stack by gluing it in place or securing it to the pipe with a screw. There are a number of problems with the Shue approach. First, the two-piece construction of the Shue device makes it less durable because the glue or other bond holding the device together may degrade over time as Shue acknowledges in mentioning replacement devices in the specification. Second, the Shue device causes water to accumulate on the roof inside the cylinder and around the roof pipe, particularly where the base of the Shue device is glued in place on the roof. Third, the Shue device inhibits the flow of gases from the roof pipe by creating a vacuum effect inside the cylinder as gas exits the cylinder. Fourth, the gas vent holes on top of the Shue device may become blocked and prevent airflow entirely, and the Shue device fails to provide any other mechanism for gas flow if this blockage occurs.

Despite the existence of such protective devices for roof pipes, further improvements in devices to protect roofing pipes are desirable.

SUMMARY OF THE INVENTION

In view of the foregoing background, it is therefore an object of the present invention to provide a damage prevention housing for protecting a roof pipe having a hollow body with an interior dimensioned to enclose a roof pipe on a roof, the hollow body having an open proximal end suitable for positioning over the roof pipe and a partially closed distal end dimensioned to preclude access by rodents but allow movement of gases therethrough. The hollow body may also include an aperture positioned adjacent to the proximal end and a fastener for securing the hollow body in a fixed position relative to the roof pipe and the roof. The aperture may be substantially circular, may be an arch having an open base on the proximal end of the hollow body with the arch extending from the proximal end toward the distal end.

The hollow body of the damage prevention housing may be provided in a variety of shapes including a substantially circular shaped enclosure surrounding the roof pipe, a substantially oval shaped enclosure surrounding the roof pipe, a multi-sided polygon shape surrounding the roof pipe or other shapes.

A damage prevention housing according to the present invention may be attached to a roof pipe or roof in a variety of ways including by fastening the damage prevention housing to a roof pipe using one or more screws positioned substantially perpendicular to the hollow body and the roof pipe and extending through the hollow body to make contact with the roof pipe.

In another embodiment, damage prevention housings of the present invention may also include a hollow body having an interior dimensioned to enclose a roof pipe on a roof, the hollow body having an open proximal end suitable for positioning over the roof pipe and a partially closed distal end dimensioned to preclude access by rodents but allow movement of gases therethrough. Such a damage prevention housing may also include a fastener for securing the hollow body in a fixed position relative to the roof pipe and the roof, and one or more roof pitch markings close to the proximal end showing where the damage prevention housing may be cut to match the pitch of a roof during installation.

The roof pitch markings may be provided for a wide range of roof pitches, including, for example, markings for roof pitches of 20 degrees, 22.5 degrees, 27 degrees, 30 degrees and 34 degrees from a horizontal roof position or markings for other degrees of roof pitch.

Another aspect of the present invention includes a method of installing a damage prevention housing for protecting a roof pipe. The method may include the steps of determining the pitch of a roof having at least one roof pipe, selecting a damage prevention housing dimensioned to enclose the roof pipe where the damage prevention housing has one or more roof pitch markings showing where the damage prevention housing may be cut to match the pitch of the roof, cutting the damage prevention housing along one of the roof pitch markings to match the pitch of the roof, and fastening the damage prevention housing in place over the roof pipe.

The methods of installing a damage prevention housing for protecting a roof pipe may include repairing damage to a lead casing surrounding a roof pipe before fastening the damage prevention housing in place over the roof pipe. The damage prevention housings of the present invention may also be installed prior to any damage to a roof pipe on an existing roof or may be installed during new construction of a roof with existing roofing materials such as a lead roof vent casing or in conjunction with other materials that replace lead roof vent casings that are intended to work with the damage prevention housing.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Figure 1:
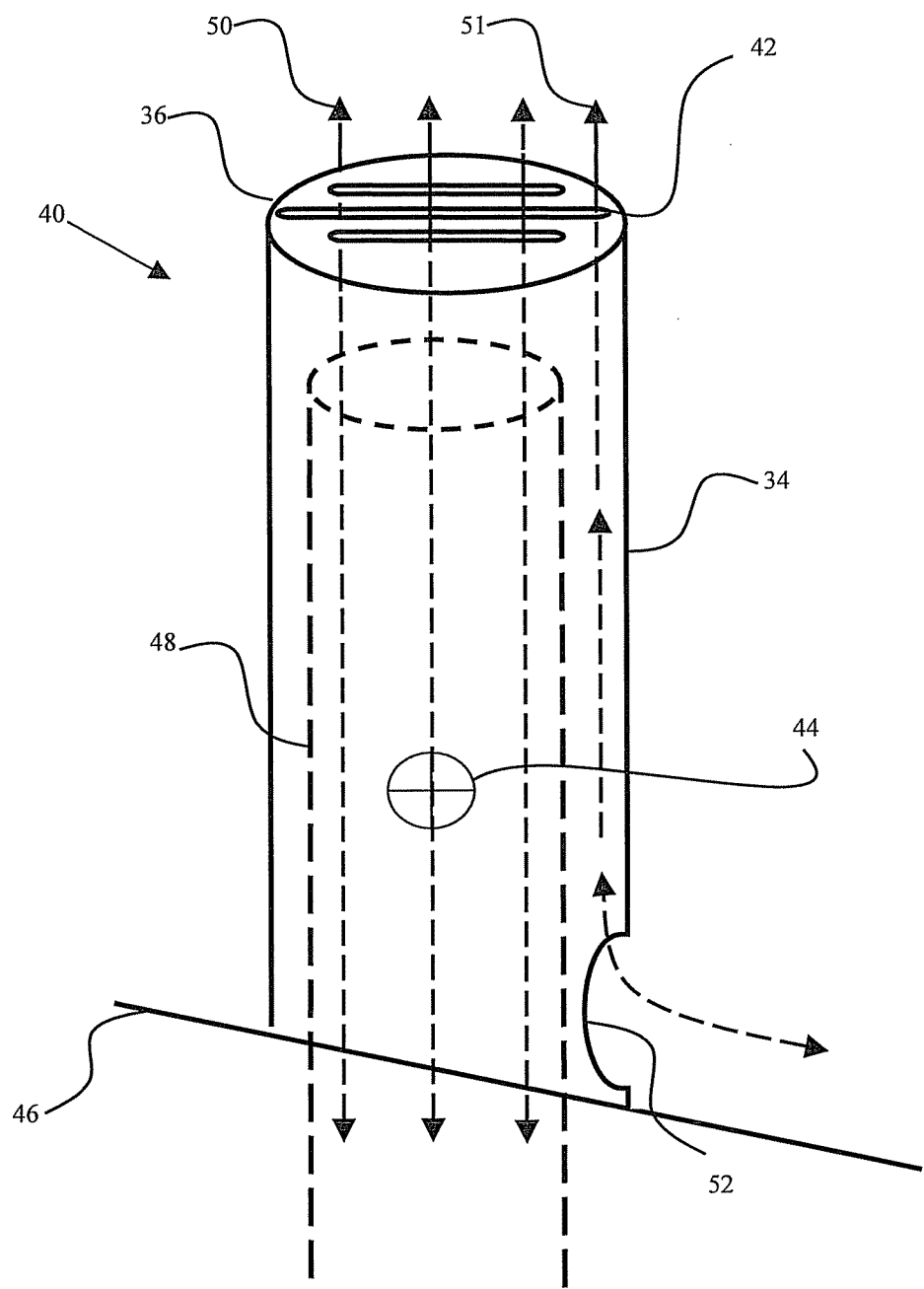
FIG. 1 is a perspective view of a damage prevention housing in place on a roof according to the present invention.

Referring initially to FIG. 1, a damage prevention housing 40 for a roof pipe 48 is shown. Certain gases are vented through roof pipes 48 extending through a building's roof 46. These roof pipes 48 are often enclosed in a lead casing (not shown) that is known to be attractive to squirrels, mice, rats and other rodents. These rodents are known to chew on the lead casing, causing extensive damage to the roof pipes 48 and leading to a number of problems. For example, rodents chewing through the lead casing will cause leaks to occur as water comes in through the casing and passes through the roof 46 around the roof pipe 48. A second problem occurs where rodents dislodge portions of the roof pipe 48 or the lead casing and cause these to drop down inside the roof pipe 48 thus causing a blockage inside the roof pipe 48 that may be very difficult to repair.

The damage prevention housing 40 of the present invention prevents damage to roof pipes 48 by rodents, weather and other potential harm by enclosing the roof pipe 48 with a protective barrier. The damage prevention housing 40 preferably has a vertically positioned hollow body 34 with an open bottom 38 for receiving the roof pipe 48, a substantially closed top 36 with an opening or openings 42 for allowing air egress, a fastener 44 for attaching the damage prevention housing 40 to the roof pipe 48 and/or roof 46 and an aperture 52 for allowing air ingress and rain or other liquid egress.

The damage prevention housing 40 may be manufactured in a variety of ways as will be appreciated by those skilled in the art. The hollow body 34 and top end 36 are preferably manufactured as a single piece using injection molding or other methods of construction allowing for the creation of a single piece. The material used for the hollow body 34 and top 36 are preferably a durable plastic or other material suitable for injection molding. If single piece construction is used for the hollow body 34 and top 36, this construction method provides a significant durability advantage over prior art devices constructed of two or more pieces with the risk that those pieces may become detached over time.

The hollow body 34 may be constructed in a variety of shapes including circular, oval, square, rectangular or any of a number of other multi-sided polygon or other shapes, so long as the shape still has an interior space sufficient to substantially enclose the roof pipe 48. In certain embodiments, the hollow body 34 may also be constructed with a sufficiently large interior diameter or other shape of interior space to reduce the chances of damage to the roof pipe 48 during installation. Such damage could occur, for example, where the damage prevention housing 40 makes contact with the roof pipe 48 during installation thus causing the roof pipe 48 to be bent or torn.

The movement of air or other gases within the hollow body 34 may also be considered when determining the interior diameter or other interior shape of the hollow body 34. Where additional air flow is desirable, the hollow body 34 may be constructed with a larger interior space to facilitate the flow of air or other gases within the damage prevention housing and the roof pipe 48. For example, an inch to two or three inches of clearance between the roof pipe 48 and the interior wall of the hollow body 34 may be provided to enhance air flow within the damage prevention housing 40.

In the preferred embodiment, the fastener 44 is two screws or bolts positioned on opposite sides of the hollow body 34. The body 34 preferably has threaded openings 42 allowing the screws or other fastener 44 to pass through the hollow body 34 and be tightened until the screws make contact with the roof pipe 48 itself or a lead casing surrounding the roof pipe 48.

The fastener 44 may also be a single screw passing through the hollow body 34 and making contact with the roof pipe 48 or lead casing. Where a single screw or bolt used, it is preferably tightened until the side of the roof pipe 48 opposite the fastener 44 makes contact with the inside wall of the hollow body 34. The fastener 44 may also be bolts, nails, glues, adhesives or other fastening implements for attaching the damage prevention housing 40 to the roof pipe 48 or directly to the roof 46 itself.

Figure 3:
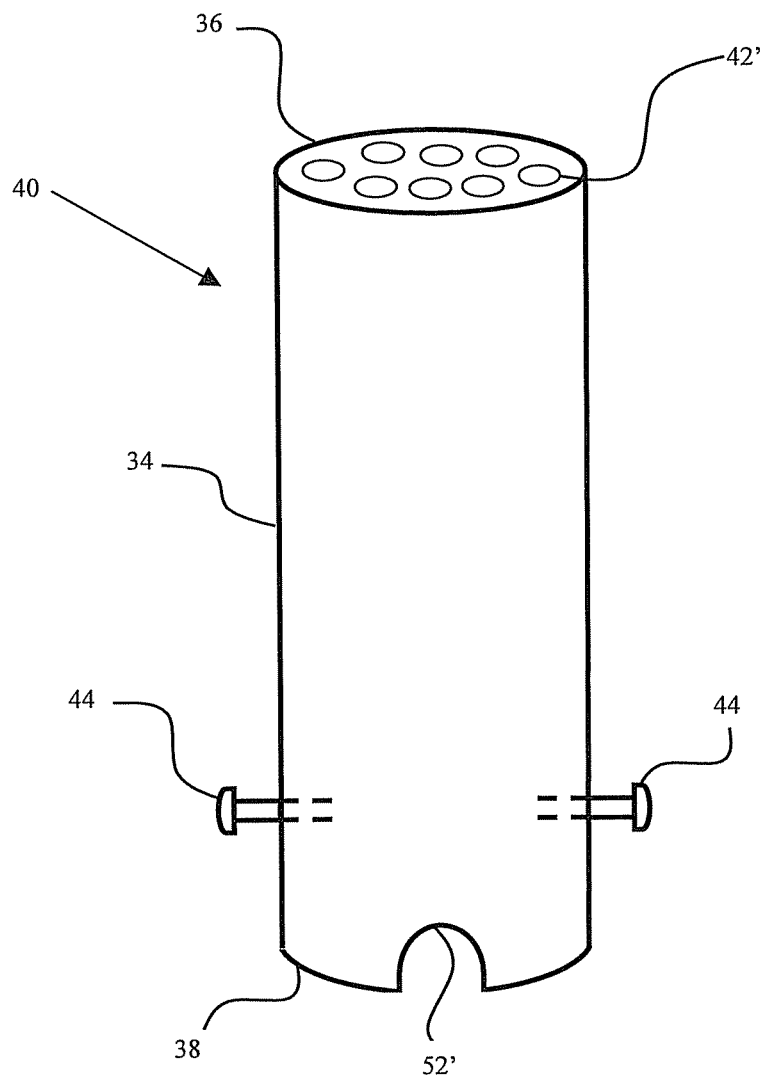
FIG. 3 is a perspective view of a damage prevention housing showing a second embodiment of the aperture for allowing air ingress and fluid egress according to the present invention.

The damage prevention housing 40 of the present invention preferably includes an opening or openings 42 on the top end 36 of the damage prevention housing 40 for allowing gases to move from the roof pipe 48 through the opening or openings 42 to the exterior of the building and from the opening or openings 42 into the roof pipe 48. The opening or openings 42 may be provided in a variety of forms including a relatively narrow slit or slits 42 as shown in FIG. 1, one or more holes 42' as shown in FIG. 3, a wire screen (not shown), or in a variety of other forms as will be appreciated by those skilled in the art.

Figure 2:
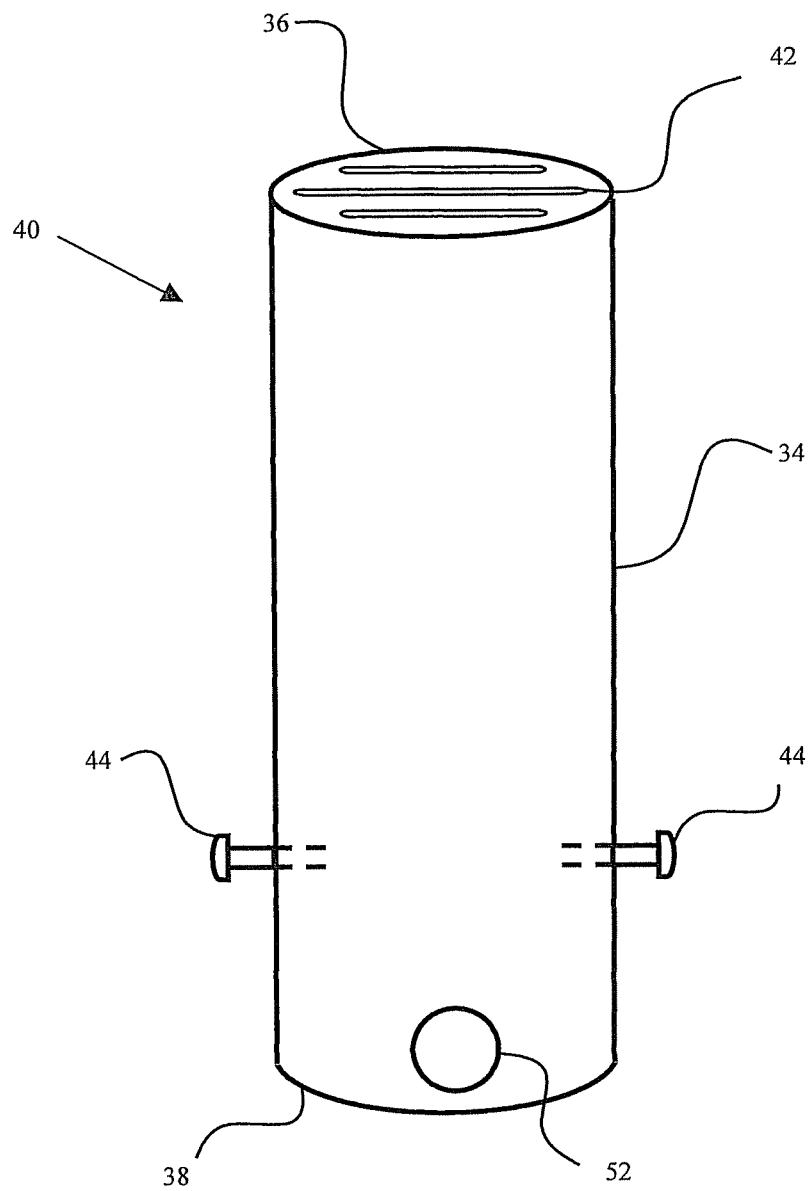
FIG. 2 is a perspective view of a damage prevention housing showing one embodiment of the aperture for allowing air ingress and fluid egress according to the present invention.

The damage prevention housing 40 of the present invention also preferably includes an aperture 52 located on or close to the bottom 38 (as shown in FIG. 2) of the damage prevention housing 40 for allowing water and other liquids to escape from the damage prevention housing 40 and allowing gas to move into and out of the damage prevention housing 40.

The aperture 52 provides a significant advantage in preventing water from accumulating inside the damage prevention housing 40 and around the roof pipe 48. If water is allowed to collect inside the damage prevention housing 40 after rain or other events causing water accumulation, there is a significantly increased risk of damage to the roof 46 and potential for water leakage into the structure of the building.

The aperture 52 also advantageously allows air or other gases to move into and out of the damage prevention housing 40 thus facilitating the movement of gases through the roof pipe 48. Illustrative examples of gas flow into and out of the damage prevention housing are shown by reference number 50 for gas moving between the roof pipe 48 and the top end 36 and by reference number 51 for gas moving between the aperture 52 and the top end 36.

The flow of gases provided by the aperture 52 is advantageous for a number of reasons. For example, if the opening or openings 42 for allowing gas to escape from the top 36 of the damage prevention housing 40 become blocked by ice, organic matter such as leaves or other blockage, the aperture 52 provides a secondary avenue for gases to move into and out of the damage prevention housing 40. If the opening or openings 42 were blocked and no secondary avenue for gas flow 50 were provided, the interruption in gas flow could cause various problems within the building. One example of this type of problem occurs where a sewage gas pipe blockage creates a vacuum effect in the sewer system for sewage roof pipes 48 that would prevent effective movement of sewage material out of the building.

The aperture 52 also enhances the flow of gases 50 into and out of the damage prevention housing 40 through a Venturi Effect, as will be appreciated by those skilled in the art. Where the aperture 52 is not present, a vacuum effect may be created within the interior of the hollow body 34 around the roof pipe 48 that inhibits the flow of gases into and out of the damage prevention housing 40 and the roof pipe 48.

The aperture 52 may be provided in a number of forms such as a circular hole aperture 52 extending through the body portion 34 to allow gas to move into and out of the damage prevention housing 40. In other embodiments, the aperture 52 may be an arch 52' with its base at the bottom 38 of the body portion 34 extending toward the top end 36 of the damage prevention housing 40. The arch embodiment 52' of the aperture 52 may be preferable in some embodiments because it is more amenable to injection molding and may also allow more effective liquid flow out from the interior of the damage prevention housing 40.

The opening or openings 42, the aperture 52 and any other areas providing access to the interior of the damage prevention housing 40 are preferably small enough to prevent rodents such as squirrels, rats and mice from gaining access to the interior of the damage prevention housing 40 through those areas.

Figure 4:
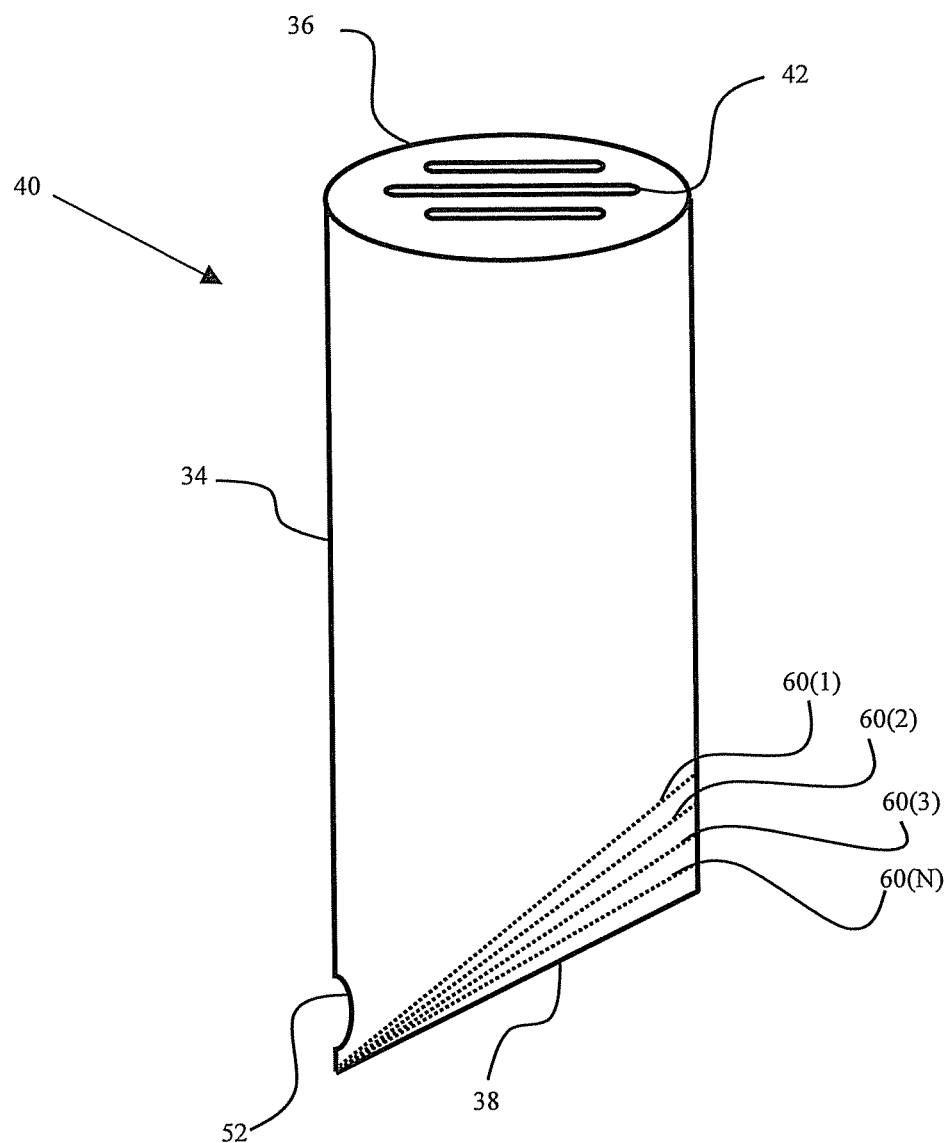
FIG. 4 is a side view of a damage prevention housing before installation showing the roof pitch markings according to the present invention.

With reference to FIG. 4, some embodiments of the damage prevention housing 40 may also include roof pitch markings 60 (shown generally by reference number 60) for cutting the bottom end 38 of the damage prevention housing 40 to match various roof pitches 60. As will be understood by those skilled in the art, roof pitch refers to the slope or angle of the roof 46 with respect to the ground below the building. In common usage, a roof 46 will only be considered "pitched" if it has a slope greater than 15 degrees. As used herein, pitch refers to all angles of roof 46 inclinations, including a zero degree pitch roof 46, which is a flat roof 46, to a roof 46 approaching 90 degree pitch.

The roof pitch markings 60 may be included to mark roof pitches in the typical range of 20 to 30 degree pitch, including markings for standard roof pitches such as 20 degree, 22.5 degree, 27 degree, 30 degree and 34 degree. The plurality of possible roof pitch markings are indicated in references numbers 60(1) to 60(N) with "N" representing the last roof pitch marking shown on the damage prevention housing 40. Roof pitch may also be indicated in roof pitch markings 60 in inches of incline per foot such as, for example, 4-12, 5-12, 6-12, 7-12, 8-12 and so on. The degree of pitch may be indicated with markings applied directly to the damage prevention housing 40 or in documentation provided with the damage prevention housing 40.

It is preferable that the roof pitch markings 60 be provided such that the dimensions of the aperture 52 are not altered by cutting along the roof pitch markings 60. This could be accomplished, for example, by placing the roof pitch markings 60(1)-(N) below the aperture 52 or at the bottom of the aperture 52 as shown in FIG. 4.

Figure 5:
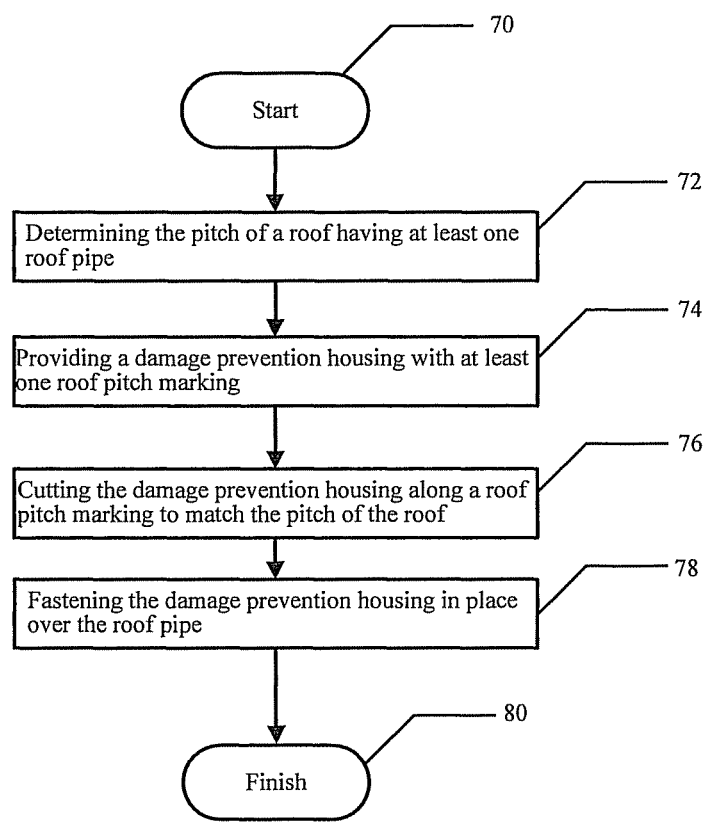
FIG. 5 is a flow diagram illustrating a method of installing a damage prevention housing according to the present invention.

Methods of installing damage prevention housings 40 are also provided as illustrated in FIG. 5. The method commences at the start (Block 70), after which the user installing the damage prevention housing 40 determines the pitch of a roof having at least one roof pipe 48 in need of protective covering (Block 72). After the roof pitch is determined, a damage prevention housing 40 having at least one roof pitch mark is provided (Block 74) and the damage prevention housing 40 is cut along the appropriate roof pitch mark to match the pitch of the roof (Block 78). After the damage prevention housing 40 is cut to the appropriate roof pitch, the damage prevention housing 40 is fastened in place over the roof pipe 48 to prevent damage to the roof pipe 48 (Block 78). The method then terminates (Block 80).

In many instances, a damage prevention housing 40 may be installed on roofs 46 after the roof pipes 48 or protective lead casing have already been damaged. The damage prevention housing 40 may also be installed during new construction.

As mentioned above, roof pipes 48 are often covered with a protective lead casing that provides resistance to weather damage. Where the damage prevention housing 40 of the present invention is used, a variety of other materials may be used in place of the lead casing because the damage prevention housing 40 of the present invention itself provides substantial protection from weather damage. Such materials to replace lead casings could include urethane, neoprene or a variety of other non-lead protective materials that would not be suitable for protecting roof pipes 48 in the absence of a damage prevention housing 40. Many of these materials have flexibility that is superior to the flexibility of lead and may, in many instances, be far less expensive than lead.

In some instances, the material replacing the lead casing may be softer or otherwise more vulnerable to puncture by the screws or bolts or other fasteners 44 being used to fasten the damage prevention housing 40 to the roof pipe 48. In such instances, it may be preferable to use a screw or other fastener 44 with a more blunt or flattened termination on the end making contact with the protective material covering the roof pipe 48 itself to reduce the chances of puncture or other damage.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A damage prevention housing for installing around a roof pipe vertically extending from a roof, the damage prevention housing comprising:

a single-piece hollow body of molded construction having an interior dimensioned to enclose the roof pipe, a bottom end, and a top end;

a bottom end opening at the bottom end, the bottom end opening being larger than the diameter of the roof pipe for allowing the roof pipe to pass therethrough;

the top end being partially closed to preclude access by rodents but allow movement of gases therethrough;

an aperture through an outer wall of the hollow body, the aperture being positioned closer to the bottom end than the top end; and a fastener for securing the hollow body in a fixed position relative to the roof pipe and the roof;

wherein when the damage prevention housing is installed around the roof pipe, the bottom end is located closer to the roof than the top end; and wherein the aperture is an arch defined by an open base at the bottom end of the hollow body with the arch extending from the bottom end toward the top end.

2. The damage prevention housing of claim 1 wherein the aperture is substantially circular.

3. The damage prevention housing of claim 1 wherein the hollow body is a substantially circular enclosure surrounding the roof pipe.

4. The damage prevention housing of claim 1 wherein the fastener comprises one or more screws positioned substantially perpendicular to the hollow body and the roof pipe and extending through the hollow body to make contact with the roof pipe.

5. A damage prevention housing for installing around a roof pipe vertically extending from a roof and having a vent opening thereon, the damage prevention housing comprising:

a single-piece hollow body of molded construction having an interior dimensioned to enclose the roof pipe between a top end positionable over the vent opening and a bottom end positionable against the roof and a cylindrical exterior shape extending all the way from the top end to the bottom end, the hollow body having first side extending between the top end and the bottom end and a second side extending between the top end and the bottom end opposite the first side, wherein the distance between the top end and bottom end on the second side is greater than the distance between the top end and the bottom end on the first side such that the bottom end defines an angled bottom end opening, the bottom end opening being larger than the diameter of the roof pipe for allowing the roof pipe to pass therethrough;

one or more top end openings through the hollow body at the top end, the one or more top end openings having at least one dimension smaller than the diameter of the vent opening for preventing rodents from entering the interior;

a fastener for securing the hollow body in a fixed position relative to the roof pipe and the roof; and an aperture through an exterior wall of the hollow body, the aperture being located along the second side at the bottom end; and wherein the aperture is an arch defined by an open base at the bottom end of the hollow body with the arch extending from the bottom end toward the top end.

6. The damage prevention housing of claim 5 wherein the aperture is substantially circular.

7. The damage prevention housing of claim 5 wherein the fastener comprises one or more screws positioned substantially perpendicular to the hollow body.

8. The damage prevention housing of claim 5, further comprising one or more roof pitch markings adjacent to the bottom end and extending across the hollow body to show where the damage prevention housing is capable of being cut to match the pitch of the roof during installation, wherein the roof pitch markings include markings for roof pitches of 20 degree, 22.5 degree, 27 degree, 30 degree and 34 degree from a horizontal roof position with respect to the ground below the building.

9. The damage prevention housing of claim 5 wherein the hollow body is a substantially circular enclosure surrounding the roof pipe.

10. A method of installing a damage prevention housing for protecting a roof pipe vertically extending from a pitched roof and having a vent opening thereon, the method comprising:

selecting a damage prevention housing dimensioned to enclose the roof pipe, the damage prevention housing having a single-piece hollow body of molded construction having an interior dimensioned to enclose the roof pipe between a top end positionable over the vent opening and a bottom end positionable against the roof, the hollow body having a first side extending between the top end and the bottom end and a second side extending between the top end and the bottom end opposite the first side, wherein the distance between the top end and bottom end on the second side is greater than the distance between the top end and the bottom end on the first side such that the bottom end defines an angled bottom end opening, the bottom end opening being larger than the diameter of the roof pipe for allowing the roof pipe to pass therethrough;

placing the damage prevention housing over the roof pipe by inserting the roof pipe through the open bottom end of the hollow body so that the bottom end is located against the roof and an aperture through the hollow body along the second side at the bottom end is positioned on the downhill side of the roof pitch; and fastening the damage prevention housing in place over the roof pipe.

11. The method of claim 10 wherein fastening the damage prevention housing in place over the roof pipe further comprises inserting one or more screws through the hollow body to make contact with the roof pipe.

* * * * *